United States Patent
Ihde

(10) Patent No.: US 10,393,082 B2
(45) Date of Patent: Aug. 27, 2019

(54) SYSTEMS AND METHODS FOR STARTING AN ENGINE USING A PERMANENT MAGNET GENERATOR

(71) Applicant: Illinois Tool Works Inc., Glenview, IL (US)

(72) Inventor: Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/797,924

(22) Filed: Oct. 30, 2017

(65) Prior Publication Data
US 2019/0128230 A1    May 2, 2019

(51) Int. Cl.
| | |
|---|---|
| H02J 7/00 | (2006.01) |
| H02K 7/18 | (2006.01) |
| H02P 9/04 | (2006.01) |
| H02K 11/20 | (2016.01) |
| H02K 11/33 | (2016.01) |
| B23K 9/10 | (2006.01) |
| F02N 11/08 | (2006.01) |

(52) U.S. Cl.
CPC ........ *F02N 11/0803* (2013.01); *B23K 9/1006* (2013.01); *F02N 11/0862* (2013.01); *H02J 7/0086* (2013.01); *H02K 7/1815* (2013.01); *H02K 11/20* (2016.01); *H02K 11/33* (2016.01); *H02P 9/04* (2013.01)

(58) Field of Classification Search
USPC ................................................. 290/30 A, 52
See application file for complete search history.

(56) References Cited

U.S. PATENT DOCUMENTS

| | | | |
|---|---|---|---|
| 5,581,168 A | 12/1996 | Rozman et al. | |
| 5,796,190 A | 8/1998 | Takeda et al. | |
| 6,265,786 B1 * | 7/2001 | Bosley | E21B 47/0008 290/46 |
| 6,325,142 B1 * | 12/2001 | Bosley | E21B 47/0008 166/53 |
| 6,495,929 B2 * | 12/2002 | Bosley | F02C 9/56 290/52 |
| 7,081,738 B2 * | 7/2006 | Muramatsu | H02M 7/53871 322/24 |
| 7,297,899 B2 | 11/2007 | Fosbinder | |
| 7,495,940 B2 * | 2/2009 | Cheng | H02P 27/08 323/282 |
| 8,159,078 B2 * | 4/2012 | Usselman | F02D 29/06 290/1 A |
| 9,186,743 B2 | 11/2015 | Radtke et al. | |
| 9,698,621 B2 * | 7/2017 | Usselman | F02D 29/06 |
| 2001/0052704 A1 * | 12/2001 | Bosley | E21B 47/0008 290/52 |

(Continued)

FOREIGN PATENT DOCUMENTS

WO        0015455        3/2000

*Primary Examiner* — Pedro J Cuevas
(74) *Attorney, Agent, or Firm* — McAndrews, Held & Malloy, Ltd.

(57) ABSTRACT

Systems and methods are disclosed of an engine driven power system that includes a permanent magnet generator coupled to the engine. An energy storage device is connected to the permanent magnet generator. A controller controls the energy storage device to provide power to the permanent magnet generator to start the engine.

20 Claims, 3 Drawing Sheets

(56) References Cited

U.S. PATENT DOCUMENTS

| | | | |
|---|---|---|---|
| 2002/0030364 A1* | 3/2002 | Bosley | F02C 9/56 |
| | | | 290/7 |
| 2003/0189339 A1* | 10/2003 | Gupta | F01D 15/10 |
| | | | 290/52 |
| 2005/0093520 A1* | 5/2005 | Muramatsu | H02M 7/53871 |
| | | | 322/29 |
| 2005/0109550 A1 | 5/2005 | Buglione et al. | |
| 2006/0037953 A1 | 2/2006 | Matthews et al. | |
| 2007/0120366 A1 | 5/2007 | Grant et al. | |
| 2007/0242490 A1* | 10/2007 | Cheng | H02P 27/08 |
| | | | 363/84 |
| 2009/0284022 A1* | 11/2009 | Usselman | F02D 29/06 |
| | | | 290/38 R |
| 2010/0314181 A1 | 12/2010 | Beeson | |
| 2012/0274077 A1* | 11/2012 | Usselman | F02D 29/06 |
| | | | 290/1 A |
| 2014/0263245 A1 | 9/2014 | Ulrich et al. | |
| 2016/0067809 A1 | 3/2016 | Enyedy et al. | |
| 2016/0175968 A1 | 6/2016 | Madsen | |
| 2016/0256950 A1 | 9/2016 | Madsen | |
| 2016/0329847 A1* | 11/2016 | Mouni | H02P 9/00 |

\* cited by examiner

SYSTEMS AND METHODS FOR STARTING AN ENGINE USING A PERMANENT MAGNET GENERATOR

BACKGROUND

Conventional welding-type power systems provide power for welding-type tools. Some such systems include a gas-powered engine configured to drive an electric generator. In some cases, the electric generator can generate both welding-type power to provide power to a variety of tools, such as welding-type torches, plasma cutters, etc. In some examples, the engine can drive accessories to the welding system, such as an air compressor. Often, if the engine is turned off or idling, a demand for power can require the engine to start. Activating the engine typically requires a starter battery to provide power to the engine to start. The addition of a starter battery can increase cost and complexity to a system. Thus, a system to start the engine without the need for a starter battery is desirable.

SUMMARY

Apparatus and methods are disclosed of an engine driven welding-type power system that employs a permanent magnet generator (PMG) to start the engine, substantially as illustrated by and described in connection with at least one of the figures, as set forth more completely in the claims.

In disclosed examples, an engine driven power system includes a permanent magnet generator coupled to the engine. An energy storage device connected to the permanent magnet generator. A controller configured to control the energy storage device to provide power to the permanent magnet generator to drive the engine.

In some examples, a converter connects the permanent magnetic generator to the energy storage device, the converter to condition power from the energy storage device to power the permanent magnetic generator.

In examples, a power sensor monitors a power demand to or from a power bus connected to an output of the permanent magnet generator. The controller is configured to determine a power output capacity of the engine, compare the power demand to the determined power output capacity, and control the energy storage device to provide power to the permanent magnet generator to start the engine in response to the power output capacity being below the power demand.

In some examples, the controller is configured to control the energy storage device to disconnect from the permanent magnet generator in response to the power output capacity being above the power demand. The controller is configured to monitor a power level of the energy storage device when the engine is driving the permanent magnet generator.

In examples, the controller configured to disconnect the energy storage device from the permanent magnet generator in response to a signal indicating the energy storage device is charged above a threshold charge level. The he controller is configured to connect the energy storage device to the permanent magnet generator in response to a signal indicating the energy storage device is charged below a threshold charge level.

In some examples, the converter is configured to condition power from the permanent magnetic generator to provide low voltage power to recharge the energy storage device when the permanent magnet generator is being driven by the engine. In examples, an output receptacle configured to connect to a welding-type tool.

In certain aspects of the disclosure, a method of operating an engine driven power system is described. The method includes monitoring, by one or more sensors, a power demand to or from a power bus connected to a permanent magnet generator or an input signal to start the engine, and connecting, by a controller, an energy storage device to provide power to the permanent magnet generator to drive the engine to start based on the power demand or the input signal.

In some examples, the method controls a converter to electrically connect the permanent magnetic generator to the energy storage device. The converter to condition power from the energy storage device to drive the permanent magnetic generator to start the engine based on the power demand. The permanent magnet generator is detachably coupled to the engine, further includes monitoring, by a sensor, a charge level of the energy storage device, and controlling, by the controller, the converter to condition power from the permanent magnetic generator to recharge the energy storage device when the permanent magnetic generator is coupled to the engine.

In examples, the method further includes disconnecting the energy storage device from the permanent magnetic generator when the permanent magnet generator is decoupled from the engine and there is no power demand to or from the power bus.

In some examples, the method includes measuring, at the controller, the speed of the engine, determining, at the controller, a power capacity of the engine based on the speed, comparing, at the controller, the power demand to the determined power capacity, and determining, by the controller, whether the power demand is above or below the determined power capacity.

In examples, the method includes controlling, by the controller, the energy storage device to provide power to the permanent magnet generator to start the engine in response to the power capacity being below the power demand. In other examples, method includes controlling, by the controller, the energy storage device to disconnect from the permanent magnet generator in response to the power capacity being above the power demand.

In some examples, the method includes monitoring, by a sensor, a pressure level of an air compressor configured to be driven by the engine, and controlling, by the controller, the energy storage device to provide power to the permanent magnet generator to drive the engine to start in response to the pressure level.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
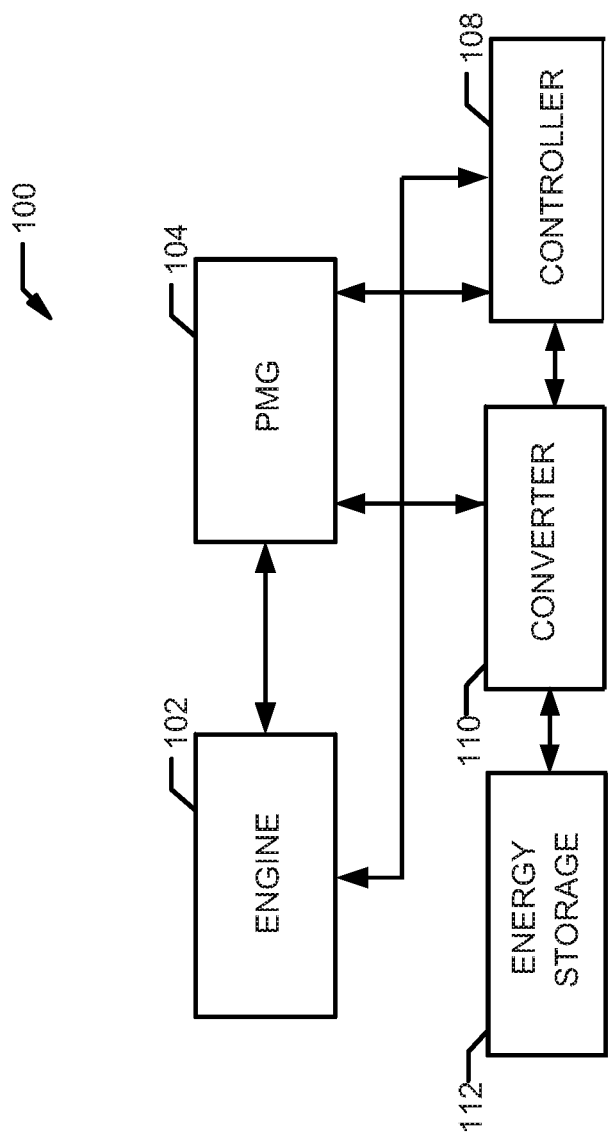
FIG. 1 is a block diagram of an example engine driven power system in accordance with aspects of this disclosure.

Disclosed are examples of an engine driven welding-type power system that employs a permanent magnet generator (PMG) to start the engine. In particular, the PMG is coupled to the engine. The PMG can be powered by an energy storage device, which in turn drives the engine to start. With an engine driven welding system using a PMG as the power generation source and an energy storage device connected thereto, it is possible to start the engine without a starter battery.

Permanent magnet generators (PMG) are a type of motor, which can be configured to create electric power. Systems that employ PMGs convert mechanical power from the engine into electrical power. PMG systems benefit from a relatively simple construction and small size, which leads to increased mobility and space savings in installation. In a PMG, the excitation field used to create electric power is provided by a permanent magnet instead of a coil, such as in an induction type motor. In particular, when the permanent magnets rotate around conducting wires, electricity is created. Advantageously, the permanent magnets in the PMG are able to run for extended periods of time, as the magnets used in these generators are constructed for long term usage and once installed can work for extended periods of time without needing replacement.

In a PMG system, the rotor and magnetic field rotate at the same speed, as the magnetic field is generated through a shaft mounted permanent magnet and current is induced into a stationary armature. For example, the rotating assembly in the center of the generator (e.g., the rotor) contains the permanent magnet, and the stationary armature (e.g., the stator) is electrically connected to a load.

Engine driven welding systems can be employed to turn an electric generator used to power a variety of welding-type tools (e.g., a welding-type torch, a wire feeder, a plasma torch, etc.), and can be in use for extended periods. Additionally, the engine can be configured to drive a hydraulic pump and/or an air compressor. As an example, the hydraulic pump and/or the air compressor can be coupled to the engine and/or the PMG to generate fluid and/or air pressure.

In some examples, an engine driven system employing a PMG, application of a current to the PMG can cause the PMG to rotate to turn the engine to start and/or increase a speed of the engine, by activating the PMG with power provided by an energy storage device.

Advantageously, PMGs do not require a separate power supply to activate the generator. For example, PMGs do not require a battery to operate, as they do not require additional current for the excitation circuit. Additionally, as PMGs do not use slip rings, the simple design limits maintenance needs in comparison to other motor types (e.g., an induction motor). Further, as the PMGs are typically housed in a sealed container, the generators are suitable for use in harsh environments that contain dust, grit and heat, which are common in a welding work sites.

As described in detail below, engine driven welding systems that employ a PMG as the power generation source can activate the PMG while the engine is off. In examples, the PMG is configured to be mechanically and/or electrically coupled and decoupled from the engine. The PMG can be directly coupled to the engine. Alternatively, the PMG can be decoupled from the engine by use of a clutch. In examples, electrical energy to power the PMG is supplied by an energy storage device, which can be integrated with the system, and/or remotely located from the system.

In the example of an air compressor, a controller can receive a signal for a power demand (e.g., via a power sensor, an input from an operator, etc.). The PMG can be activated by power from a power storage device in response to the signal (e.g., via a converter) to turn the engine to start.

Employing a welding-type power system with a PMG to start the engine, as described herein, overcomes the challenges faced in conventional systems. Among the many advantages include no longer requiring a starter battery, which will decrease maintenance and replacement costs.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "welding-type system" includes any device capable of supplying power suitable for welding, plasma cutting, induction heating, CAC-A and/or hot wire welding/preheating (including laser welding and laser cladding), including inverters, converters, choppers, resonant power supplies, quasi-resonant power supplies, etc., as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

As used herein, "energy storage device" is any device that stores energy, such as, for example, a battery, a super capacitor, etc.

As used herein, a "converter" includes a power circuit that receives or provides an ac or dc signal, and converts it to the other of an ac or dc signal, or to a different frequency.

FIG. 1 is a block diagram of an engine driven power system 100. The example power system 100 includes an engine 102 coupled to a permanent magnet generator (PMG) 104. A controller 108 is connected to each of the engine 102, the PMG 104, and an energy storage device 112. In the example of FIG. 1, energy storage device 112 is connected to the PMG via a converter 110, such as a bi-directional converter, to convert energy from the energy storage device 112 to the PMG 104, and/or convert energy from the engine 102, via PMG 104, to the energy storage device 112.

In an example, the controller 108 determines a power demand associated with the system, such as based on a sensor signal. In response, the controller 108 controls the converter 110 to provide power from the energy storage device 112 to the PMG 104. In the current example, the PMG 104 and the engine 102 are directly coupled, such that rotation of the PMG 104, initiated in response to the application of power via the energy storage device 112, turns the engine 102 to start. Alternatively, the engine 102 and the PMG 104 are detachably coupled via a clutch.

The PMG 104 can turn the engine 102 start in response to a power demand when the engine 102 is turned off, idling, out of fuel, etc. The controller 108 can determine whether the engine 102 is not operating due to a signal from one or more sensors that monitor operational parameters of the engine 102, such as voltage, current, resistance, temperature, pressure, rotation speed, etc. In an example, the controller 108 of FIG. 1 can be configured as a processor or microcontroller, such as a programmable logic circuit, a system-on-chip, a programmable logic device, and/or any other type of logic circuit.

Activating the PMG 104 to drive the engine 102 according to the determined power demand may be controlled automatically by the controller 108. In an example, the power demand generates an automatic response by the controller 108, such as to activate the converter 110 to provide power from the energy storage device 112 to the PMG 104 to start the engine 102, such as in response to a signal indicating a low power demand level. In response to a signal indicating a power demand level above a threshold high-power demand level, the controller 108 deactivates the converter 110 to stop provision of power from the energy storage device 112 to the PMG 104. In examples, one or more threshold power demand levels can be stored on a memory storage device, such as integrated with the controller 108. The threshold power demand levels can be learned (e.g., based on historical data, via machine learning techniques) and/or be set by an operator (e.g., via a user interface).

Additionally or alternatively, the controller can periodically transmit a test signal to continually monitor the power demand and compare the power demand level to a plurality of threshold power demand levels (e.g., a high and/or a low-power demand level). In some examples, a user can initiate the PMG 104 to start the engine 102 via an interface, selector switch, etc., as described with respect to FIG. 2.

In some examples, the energy storage device 112 is a rechargeable battery pack (e.g., a lithium-ion battery, a nickel-metal hydride battery, etc.). In other examples, the energy storage device 112 is a hybrid battery module, a capacitor, a supercapacitor, or any other type of suitable storage device. The sensor may provide information of the energy storage device 112, such as parameters of a particular type of energy storage device including a charge state (e.g., above/below a threshold charge level), a nominal voltage (e.g., an output voltage when the energy storage device is charged above a threshold level), and/or any other parameter that can be recognized in the signal, such as resistance, current, temperature, for example. Similar to the pressure power demand levels, the one or more threshold charge levels can be stored on a memory storage device, such as integrated with the controller 108. The threshold charge levels can be learned (e.g., based on historical data, via machine learning techniques) and/or be set by an operator (e.g., via a user interface).

If the charge level is below a threshold level, the controller 108 can control the converter 110 to charge the energy storage device 112, such as when PMG 104 is being driven by the engine 102. In a battery recharging operation, by monitoring the signal, the controller 104 can detect an end of a charging operation. In response to detecting the end of the charging operation (i.e., the feedback signal indicates the battery is charged to a threshold level), the controller 104 can command the converter 110 to end provision of power to the energy storage device 112 and/or modify a sub-mode (e.g., change from a normal battery charging sub-mode to a trickle charging sub-mode). Thus, converter 110 is configured to provide power to the energy storage device from the PMG 104 in a recharging mode. In this manner, the system 100 can automatically adjust to a change in the power needs of the energy storage device 112.

In some examples, the system 100 can connect to an air compressor and/or a hydraulic pump. Thus, sensors can be configured to sense a pressure level of a fluid of the hydraulic pump and/or compressor, and activate the PMG 104 to start, as described with respect to the power demand.

Figure 2:
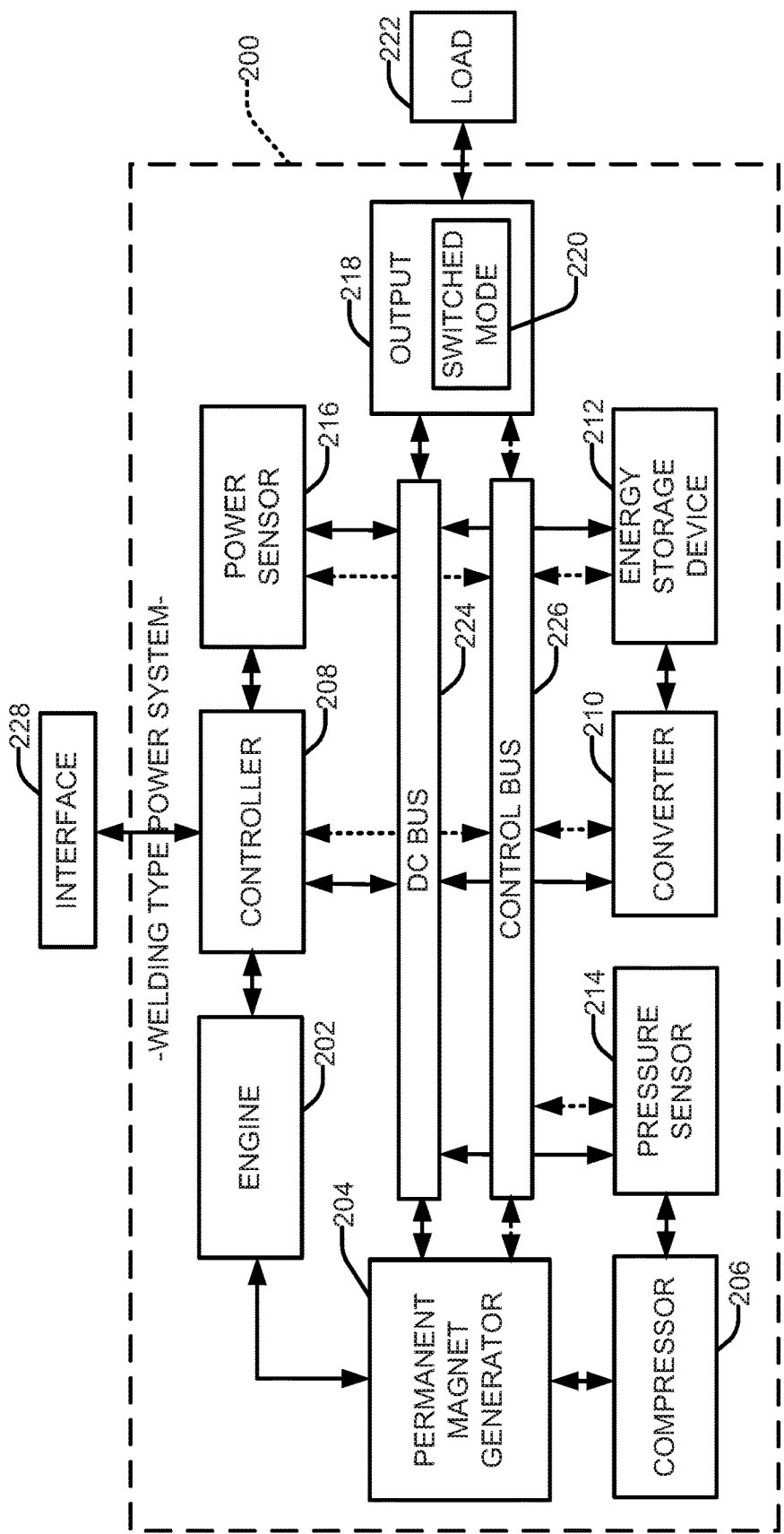
FIG. 2 is a block diagram of an example welding-type power system in accordance with aspects of this disclosure.

FIG. 2 illustrates a block diagram of an example welding-type power system 200. In the system 200, a DC bus 224 is configured to transmit power to and/or from one component to another. In an example, the system 200 would employ the DC bus 224 with a voltage sufficient to power a welding-type tool. In some examples, the DC bus 224 can be converted to make 115 or 220 volts alternating current (VAC) to power auxiliary power components (e.g., a wire feeder), plasma cutters, a battery charger, as well as other systems. The DC bus 224 could connect to a switched mode power supply 220 (e.g., a power inverter) to condition the bus voltage at an output 218. For example, while an engine 202 is driving a permanent magnet generator (PMG) 204, the PMG 204 is generating power for one or more of a controller 208, a converter 210, an energy storage device 212, a pressure sensor 214, a power sensor 216, and the output 218. A control bus 226 is similarly connected and configured to transmit information and commands between components. Thus, when the power sensor 216 senses a power demand above a threshold level, the controller 208 can activate the converter 210 to convert power from the energy storage device 212 to power the PMG 204 to start the engine 202. In this manner, information and control signals can be transmitted via the common bus, such that individual components do not require additional wiring or dedicated communication lines between components.

In some examples, the sensor(s) 214, 216 are incorporated with the system 200, such as with controller 208. In other examples, sensor(s) 214, 216 are located on one or more components (e.g., engine 202, compressor 206, etc.). Additionally or alternatively, the sensor(s) 214, 216 are located remote from the system 200, and can be configured to monitor one or more operational parameters indirectly (e.g., via temperature, infrared signature, etc.). Based on the monitored parameters, the controller 208 can control the operation of one or more of the engine 202, the PMG 204, the compressor 206, and the energy storage device 212.

Additionally or alternatively, the output 218 can connect to a load 222. Thus, as the PMG 204 generates power, the output 218 can provide output power for a load 222, such as a hand tool. The switched mode power supply 220 can be located at the output 218 or integrated therein to condition power for the load. For instance, a particular load can be identified as requiring a particular level of voltage via one or more sensors (e.g., a low battery charging voltage, a high voltage for a high speed grinder, etc.), and the controller 208 can control the switched mode power supply 220 accordingly. In an example, the output 218 is configured for a particular type of connection (e.g., a welding-type torch cable), while in other examples the power output 218 can be modified to accept multiple types of connectors. In this example, the multi-mode power output 218 may be configured with multiple connection outputs, and/or one or more adapters to accommodate various loads 222 (e.g., a welding-type torch, a rechargeable battery, 120-volt power cord, etc.). In examples, the load 222 can initiate the power demand signal from the power sensor 216.

In the example of FIG. 2, the system 200 can include an interface 228 (e.g., a switch, a computer input device, etc.) to provide option for an operator to control a function of the power sources and/or outputs at the system 200. For example, the interface 228 can allow a user to turn off one or more components of the system 200 (e.g., the engine 202), and activate others (e.g., the energy storage device 212, converter 210). In this example, the PMG 204 can be supplied with power from the energy storage device 212 to start the engine 202 in response to a power demand, a control signal, etc. Additionally or alternatively, the user interface can include a list of operations with either a set of known parameters, or a list of operations that correspond to a learned operation. Thus, the known or historical actions and conditions during a particular operation will aid in the determination of threshold levels, such as a high threshold level corresponding to an upper limit of power demand and a low threshold level corresponding to a lower limit of power demand.

Recharging the energy storage device 218 can occur automatically, based on a signal (e.g., from sensor 216) indicating the charge level of the energy storage device 218 has fallen below a threshold level. Further, the controller 206 may command the welding power system 200 to charge energy storage device 218, even when welding is not occurring. Additionally and/or alternatively, a user can initiate recharging of the energy storage device 218 via the interface 228.

Figure 3:
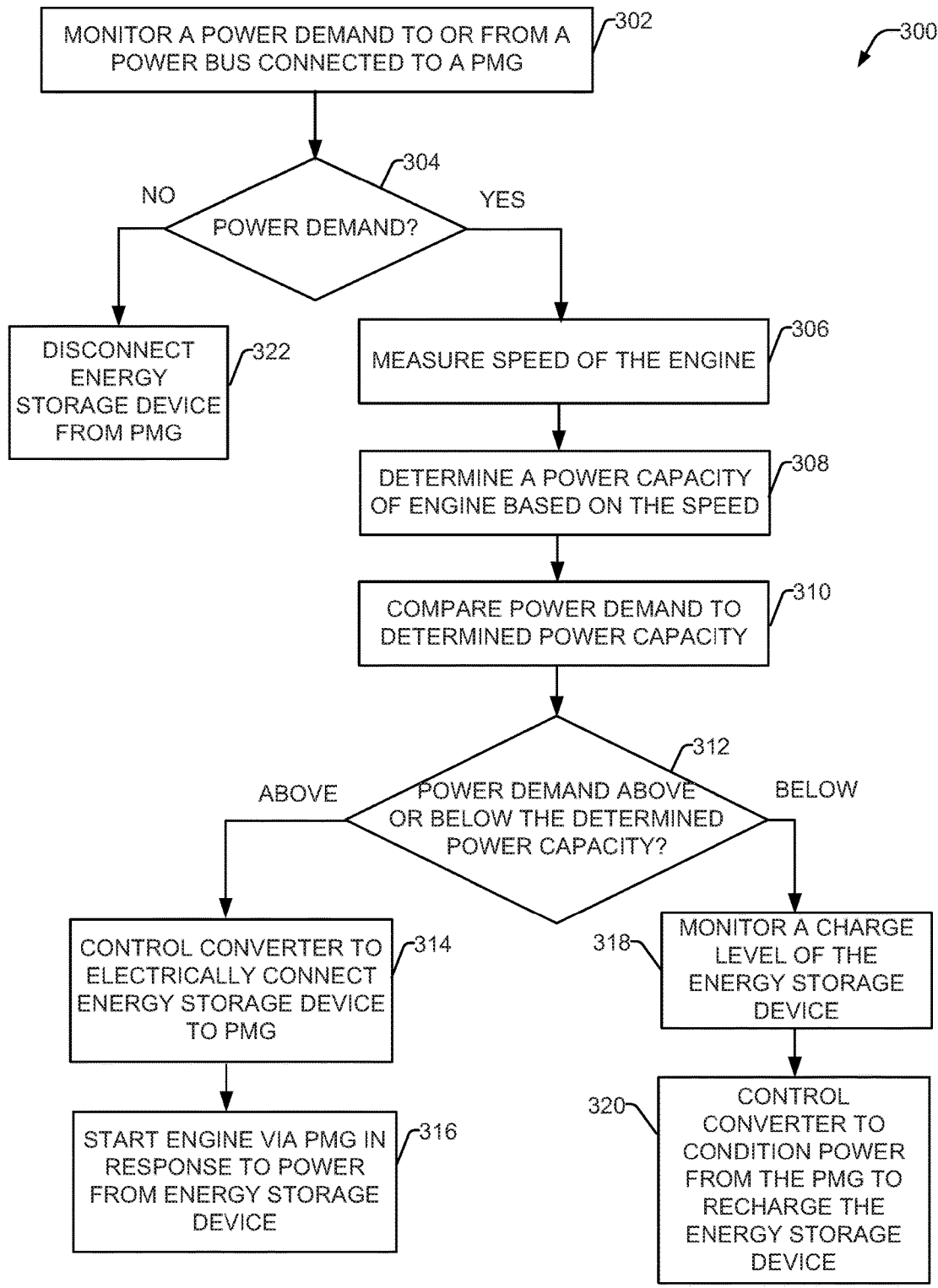
FIG. 3 illustrates an example method of operating an engine driven power system in accordance with aspects of this disclosure.

FIG. 3 is a flowchart illustrating example method 300 of operating an engine driven welding-type power system, for example the systems 100 and 200 of FIGS. 1-2. The method 300 of FIG. 3 may be implemented by the controllers 108 and 208 of FIGS. 1-2 by executing machine-readable instructions, such as stored on a non-transitory machine-readable storage device. At block 302, a sensor (e.g., the sensor 214) monitors a power demand to or from a power bus (e.g., the DC bus 224) connected to the PMG (e.g., the PMGs 104, 204). At block 304, it is determined by a controller (e.g., the controllers 108, 208) whether a power demand is present based on the monitoring. At block 306, the speed of an engine (e.g., the engines 102, 202) is measured. At block 308, the controller determines a power capacity of the engine based on the speed. For example, the engine may be off, which would indicate a low (e.g., zero) power capacity. If the engine is turning at operating speed, however, the power capacity would be much higher, consistent with the particular engine design. At 310, the measured power demand is compared against the determined power capacity.

In block 312, the controller determines whether the power demand is above or below the determined power capacity. If the power demand is above the determined power capacity, the method continues to block 314 to control a converter (e.g., the converters 110, 210) to electrically connect an energy storage device (e.g. the energy storage device 112, 212) to the PMG. In block 316, the PMG turns to start the engine in response to the power from the energy storage device.

If the power demand is below the determined power capacity (e.g., the engine is on and/or no power demand is measured), the method proceeds to block 318, to monitor a charge level of the energy storage device. The controller can compare the charge level against a plurality of charge levels to determine whether the energy storage device is in need of recharging. If the charge level is low, the controller controls the converter to condition power from the PMG to recharge the energy storage device in block 320. Thus, the bi-directional converter is configured to condition power from, for example, the power bus 224, while the engine is driving the PMG, to recharge the energy storage device.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. In other words, "x and/or y" means "one or both of x and y". As another example, "x, y, and/or z" means any element of the seven-element set $\{(x), (y), (z), (x, y), (x, z), (y, z), (x, y, z)\}$. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. An engine driven power system, comprising:
   a permanent magnet generator coupled to the engine;
   an energy storage device connected to the permanent magnet generator; and
   a controller configured to:
     determine a power output capacity of the engine; and
     control the energy storage device to provide power to the permanent magnet generator to drive the engine.

2. The engine driven power system as defined in claim 1, further comprising a converter connecting the permanent magnetic generator to the energy storage device, the converter to condition power from the energy storage device to power the permanent magnetic generator.

3. The engine driven power system as defined in claim 1, further comprising a power sensor to monitor a power demand to or from a power bus connected to an output of the permanent magnet generator.

4. The engine driven power system as defined in claim 1, the controller configured to:
   compare the power demand to the determined power output capacity; and
   control the energy storage device to provide power to the permanent magnet generator to start the engine in response to the power output capacity being below the power demand.

5. The engine driven power system as defined in claim 1, the controller configured to control the energy storage device to disconnect from the permanent magnet generator in response to the power output capacity being above the power demand.

6. The engine driven power system of claim 1, the controller configured to monitor a power level of the energy storage device when the engine is driving the permanent magnet generator.

7. The engine driven power system of claim 6, the controller configured to disconnect the energy storage device from the permanent magnet generator in response to a signal indicating the energy storage device is charged above a threshold charge level.

8. The engine driven power system of claim 6, wherein the controller is configured to connect the energy storage device to the permanent magnet generator in response to a signal indicating the energy storage device is charged below a threshold charge level.

9. The engine driven power system as defined in claim 8, wherein the converter is configured to condition power from the permanent magnetic generator to provide low voltage power to recharge the energy storage device when the permanent magnet generator is being driven by the engine.

10. The engine driven power system of claim 1, further comprising an output receptacle configured to connect to a welding-type tool.

11. A method of operating an engine driven power system, comprising:
    monitoring, by one or more sensors, a power demand to or from a power bus connected to a permanent magnet generator or an input signal to start the engine;
    determining, at the controller, a power capacity of the engine based on a speed of the engine; and
    connecting, by a controller, an energy storage device to provide power to the permanent magnet generator to drive the engine to start based on the power demand, the power capacity, or the input signal.

12. The method of operating an engine driven power system as defined in claim 11, further comprising controlling, by a controller, a converter to electrically connect the permanent magnetic generator to the energy storage device.

13. The method of operating an engine driven power system as defined in claim 12, further comprising controlling, by the controller, the converter to condition power from the energy storage device to drive the permanent magnetic generator to start the engine based on the power demand.

14. The method of operating an engine driven power system as defined in claim 13, wherein the permanent magnet generator is detachably coupled to the engine, further comprising:
    monitoring, by a sensor, a charge level of the energy storage device; and
    controlling, by the controller, the converter to condition power from the permanent magnetic generator to recharge the energy storage device when the permanent magnetic generator is coupled to the engine.

15. The method of operating an engine driven power system as defined in claim 14, the method further comprising disconnecting the energy storage device from the permanent magnetic generator when the permanent magnet generator is decoupled from the engine and there is no power demand to or from the power bus.

16. The method of operating an engine driven power system as defined in claim 11, further comprising:
    measuring, at the controller, the speed of the engine;
    comparing, at the controller, the power demand to the determined power capacity; and
    determining, by the controller, whether the power demand is above or below the determined power capacity.

17. The method of operating an engine driven power system as defined in claim 16, further comprising controlling, by the controller, the energy storage device to provide power to the permanent magnet generator to start the engine in response to the power capacity being below the power demand.

18. The method of operating an engine driven power system as defined in claim 16, further comprising controlling, by the controller, the energy storage device to disconnect from the permanent magnet generator in response to the power capacity being above the power demand.

19. The method of operating an engine driven power system as defined in claim 11, further comprising:
    monitoring, by a sensor, a pressure level of an air compressor configured to be driven by the engine; and
    controlling, by the controller, the energy storage device to provide power to the permanent magnet generator to drive the engine to start in response to the pressure level.

20. An engine driven power system, comprising:
    a permanent magnet generator coupled to the engine;
    a power sensor to monitor a power demand to or from a power bus connected to an output of the permanent magnet generator;
    an energy storage device connected to the permanent magnet generator; and
    a controller configured to:
        determine a power output capacity of the engine;
        compare the power demand to the determined power output capacity; and
        control the energy storage device to provide power to the permanent magnet generator to drive the engine in response to the power output capacity being below the power demand.

* * * * *